United States Patent
Yaegashi et al.

(10) Patent No.: US 11,230,785 B2
(45) Date of Patent: Jan. 25, 2022

(54) SURFACE-TREATED ALUMINUM MATERIAL AND METHOD FOR MANUFACTURING SAME; AND BONDED BODY OF SURFACE-TREATED ALUMINUM MATERIAL AND BONDING MEMBER COMPRISING SAID SURFACE-TREATED ALUMINUM MATERIAL, AND BONDING MEMBER SUCH AS RESIN, AND METHOD FOR MANUFACTURING SAID BONDED BODY

(71) Applicant: UACJ CORPORATION, Tokyo (JP)

(72) Inventors: Tatsuhiro Yaegashi, Tokyo (JP); Tatsuya Mimura, Tokyo (JP); Takahiro Koyama, Tokyo (JP)

(73) Assignee: UACJ Corporation, Tokyo (JP)

( * ) Notice: Subject to any disclaimer, the term of this patent is extended or adjusted under 35 U.S.C. 154(b) by 42 days.

(21) Appl. No.: 16/486,745

(22) PCT Filed: Feb. 19, 2018

(86) PCT No.: PCT/JP2018/005755
§ 371 (c)(1),
(2) Date: Oct. 2, 2019

(87) PCT Pub. No.: WO2018/155383
PCT Pub. Date: Aug. 30, 2018

(65) Prior Publication Data
US 2020/0017988 A1    Jan. 16, 2020

(30) Foreign Application Priority Data

Feb. 22, 2017  (JP) .............................. JP2017-030745
Feb. 10, 2018  (JP) .............................. JP2018-022589

(51) Int. Cl.
*C25D 11/04* (2006.01)
*B32B 3/30* (2006.01)
(Continued)

(52) U.S. Cl.
CPC ................ *C25D 11/04* (2013.01); *B32B 3/30* (2013.01); *B32B 15/08* (2013.01); *B32B 15/20* (2013.01); *C25D 11/18* (2013.01)

(58) Field of Classification Search
CPC .................................. C25D 11/18; B32B 3/30
See application file for complete search history.

(56) References Cited

U.S. PATENT DOCUMENTS

2014/0363658 A1   12/2014  Sun et al.
2014/0363659 A1   12/2014  Sun et al.
2015/0079384 A1    3/2015  Zhang et al.

FOREIGN PATENT DOCUMENTS

CN    103287009 A    9/2013
CN    103290449 A    9/2013
(Continued)

OTHER PUBLICATIONS

Goto et al., Machine Translation, JP H09-316693 A (Year: 1997).*
ISR issued in Int'l. patent application No. PCT/JP2018/005755, dated Apr. 24, 2018.
Office Action of Jun. 2, 2021 issued in corresponding CN patent application No. 201880013004.X.

*Primary Examiner* — Ho-Sung Chung
(74) *Attorney, Agent, or Firm* — Greer Burns & Crain Ltd.

(57) ABSTRACT

There are provided: a surface-treated aluminum material including an aluminum base material and an alkali alternating current electrolytic oxide coating film formed on at least a part of a surface of the aluminum base material, wherein the alkali alternating current electrolytic oxide coating film includes a porous-type aluminum oxide coating film layer formed on a surface side and a barrier-type aluminum oxide coating film layer formed on a base material side, and plural (Continued)

working grooves perpendicular to the direction of plastic working are formed; a method of producing the surface-treated aluminum material; a bonded body of the surface-treated aluminum material and a member to be bonded, including the surface-treated aluminum material and the member to be bonded, such as resin; and a method of producing the bonded body.

8 Claims, 3 Drawing Sheets

(51) Int. Cl.
*B32B 15/20* (2006.01)
*B32B 15/08* (2006.01)
*C25D 11/18* (2006.01)

(56) References Cited

FOREIGN PATENT DOCUMENTS

| | | | |
|---|---|---|---|
| CN | 103448200 A | 12/2013 |
| CN | 103451704 A | 12/2013 |
| CN | 104114752 A | 10/2014 |
| CN | 105408527 A | 3/2016 |
| JP | 09316693 A | 12/1997 |
| JP | 2009228064 A | 10/2009 |
| JP | 2015137402 A | 7/2015 |
| JP | 2015137404 A | 7/2015 |
| JP | 2016148079 A | 8/2016 |

\* cited by examiner

SURFACE-TREATED ALUMINUM MATERIAL AND METHOD FOR MANUFACTURING SAME; AND BONDED BODY OF SURFACE-TREATED ALUMINUM MATERIAL AND BONDING MEMBER COMPRISING SAID SURFACE-TREATED ALUMINUM MATERIAL, AND BONDING MEMBER SUCH AS RESIN, AND METHOD FOR MANUFACTURING SAID BONDED BODY

TECHNICAL FIELD

The present disclosure relates to a pure aluminum material or aluminum alloy material (hereinafter, simply abbreviated as "aluminum material") subjected to surface treatment, and a method of producing the pure aluminum material or aluminum alloy material. Specifically, the present disclosure relates to: a surface-treated aluminum material on which an alkali alternating current electrolytic oxide coating film excellent in both of durability after intimate contact with resin and durability between the alkali alternating current electrolytic oxide coating film and an aluminum base material is formed by performing plastic working of an aluminum material subjected to surface treatment of forming an alkali alternating current electrolytic oxide coating film excellent in property of intimate contact with resin, and simultaneously introducing a fine working groove into the alkali alternating current electrolytic oxide coating film; and a method of producing the surface-treated aluminum material. The present disclosure further relates to: a bonded body of the surface-treated aluminum material and a member to be bonded, including the surface-treated aluminum material and the member to be bonded, such as resin, and having excellent intimate contact durability and working followability; and a method of producing the bonded body.

BACKGROUND ART

Aluminum materials are used in various structural members, heat exchanger members, containers, packages, electronic instruments, machines, and the like because such aluminum materials are lightweight, have appropriate mechanical characteristics, and have excellent features of aesthetic sense, conductivity, heat dissipation properties, corrosion resistance, and recyclability. The aluminum materials, imparted with and improved in properties such as corrosion resistance, insulation properties, intimate contact properties, antibacterial properties, and wear resistance by subjecting a part or the whole of each of the aluminum materials to surface treatment, are also often used.

In recent years, resource conservation and the reduction of energy consumption have progressed mainly in the automobile industry, and structural members in which a part or the whole of an aluminum material is bonded to resin in order to further reduce a weight in the case of applying the aluminum material to each structural member have been proposed. The structural members are used in transportation instruments, and therefore require high intimate contact durability in atmospheric and corrosive environments. The structural members may also be subjected to bending working, press working, and/or the like, and may also be bonded to resin after having been subjected to plastic working.

When a member, a coated member, or the like in which such an aluminum material is bonded to resin is produced, surface treatment is also required for improving the property of intimate contact with resin of the aluminum material. For example, such an alkali alternating current electrolytic method as in Patent Literature 1 is proposed. In other words, alternating current electrolysis treatment is performed at a current density of 4 to 50 A/dm$^2$, a frequency of 20 to 100 Hz, and an electrolysis time of 5 to 60 seconds using, as an electrolytic solution, an aqueous alkaline solution in which the concentration of an acrylic acid compound polymer is 0.1 to 10% by weight at a liquid temperature of 35 to 85° C. It is described that as a result, an aluminum material is obtained, including a surface provided with an oxide coating film in which pores having a size of 5 to 50 nm are formed.

For example, such a method as in Patent Literature 2 is proposed for enhancing working followability in the case of bringing an aluminum material into intimate contact with resin and the like, and then performing bending working and the like. In other words, alternating current electrolytic treatment is performed using a waveform in which an anodic peak voltage at the time of the end of electrolysis is 25 to 200 V, with the use of, as an electrolytic solution, an aqueous alkaline solution having a pH of 9 to 13 and a liquid temperature of 30 to 90° C. It is described that as a result, an aluminum material is obtained, in which the area occupancy rate of pores on a surface of a porous-type aluminum oxide coating film layer is 5 to 50%.

These conventional technology literatures relate to methods in which an aluminum material is subjected to surface treatment, immediately followed by bringing the aluminum material into intimate contact with resin. However, a step may also be adopted, in which after formation of an oxide coating film on an aluminum material, the aluminum material is subjected to plastic working such as press working, bending working, or tensile working before bonding of resin, and the resin is then bonded to a worked portion.

However, there has been a problem that when such a surface-treated aluminum material as described in Patent Literature 1 is subjected to plastic working, an oxide coating film may be peeled from an aluminum base material prior to bonding of resin, and as a result, the bonding of the resin becomes impossible.

In the surface treatment described in Patent Literature 2, there has been a problem that although it is possible to perform the bending working after the aluminum material is brought into intimate contact with the resin and the like, the plastic working prior to the bonding of the resin after the surface treatment results in propagation of cracks on an entire surface of the porous-type aluminum oxide coating film layer regardless of the direction of the working, thereby preventing desired bond strength from being obtained.

CITATION LIST

Patent Literature

Patent Literature 1: Unexamined Japanese Patent Application Kokai Publication No. 2009-228064
Patent Literature 2: Unexamined Japanese Patent Application Kokai Publication No. 2016-148079

SUMMARY OF INVENTION

Technical Problem

As a result of repeating examination for solving the problems described above, the present inventors accomplished the present disclosure. It was found that working grooves can be finely introduced only in a direction perpendicular to a working direction without cracking an entire surface of an oxide coating film by subjecting a porous aluminum oxide coating film layer to plastic working at a predetermined strain rate. Disposition of the working grooves at predetermined widths and spacings not only enables an alkali alternating current electrolytic oxide coating film to be suppressed from peeling from an aluminum base material but also enables resin or the like as a member to be bonded, to flow into both pores and the working grooves. It was found that as a result, the effect of mechanical bonding between a surface-treated aluminum material and the member to be bonded is enhanced, thereby obtaining an alkali alternating current electrolytic oxide coating film structure having a further excellent property of intimate contact with a member to be bonded, such as, for example, easily adhesive resin or hardly adhesive resin.

In addition, it was found that working grooves can be finely introduced in a direction perpendicular to a working direction by plastic working at a predetermined strain rate, and the spacings between the plural working grooves introduced at the time of the plastic working can be particularly controlled by adjusting the strength of an aluminum base material in advance before surface treatment, and further adjusting the temperature of a surface-treated aluminum material from alternating current electrolytic treatment to the plastic working. As a result, further suppression of an alkali alternating current electrolytic oxide coating film from peeling from an aluminum base material was enabled.

Solution to Problem

In other words, claim 1 in the present disclosure describes a surface-treated aluminum material including an aluminum base material and an alkali alternating current electrolytic oxide coating film formed on at least a part of a surface of the aluminum base material, wherein a plurality of working grooves perpendicular to a direction of plastic working are formed on the alkali alternating current electrolytic oxide coating film.

Claim 2 in the present disclosure describes that the alkali alternating current electrolytic oxide coating film includes: a porous-type aluminum oxide coating film layer formed on a surface side and having a thickness of 20 to 1000 nm; and a barrier-type aluminum oxide coating film layer formed on a base material side and having a thickness of 3 to 30 nm, in accordance with claim 1.

Claim 3 in the present disclosure describes that pores having an average maximum diameter of 5 to 120 nm are formed in the porous-type aluminum oxide coating film layer, in accordance with claim 1 or 2.

Claim 4 in the present disclosure describes that widths of the working grooves are 5 to 5000 nm, in accordance with any one of claims 1 to 3.

Claim 5 in the present disclosure describes that spacings between the working grooves are 5 to 5000 nm, in accordance with any one of claims 1 to 4.

Claim 6 in the present disclosure describes that an area occupancy rate of all the pores with respect to a surface area of the porous-type aluminum oxide coating film layer is 5 to 50%, in accordance with any one of claims 1 to 5.

Claim 7 in the present disclosure describes that the average maximum diameter of the pores in the porous-type aluminum oxide coating film layer is 5 to 120 nm, in accordance with any one of claims 1 to 6.

Claim 8 in the present disclosure describes a method of producing the surface-treated aluminum material according to any one of claims 1 to 7, the method including performing plastic working, at a strain rate of $1.0 \times 10^{-3}$ to $1.0 \times 10^3$/s, of an aluminum base material subjected to alternating current electrolytic treatment after the alternating current electrolytic treatment with use of an aqueous alkaline solution as an electrolytic solution using an electrode and a counter electrode of the aluminum base material to be surface-treated.

Claim 9 in the present disclosure describes that a temperature of the electrolytic solution as the aqueous alkaline solution is 30 to 90° C., in accordance with claim 8.

Claim 10 in the present disclosure describes that a pH of the electrolytic solution as the aqueous alkaline solution is 9 to 13, in accordance with claim 8 or 9.

Claim 11 in the present disclosure describes that an electrolytic treatment time period of the alternating current electrolytic treatment is 5 to 600 seconds, in accordance with any one of claims 8 to 10.

Claim 12 in the present disclosure describes that a current density of the alternating current electrolytic treatment is 4 to 50 A/dm$^2$, in accordance with any one of claims 8 to 11.

Claim 13 in the present disclosure describes that a frequency of the alternating current electrolytic treatment is 10 to 100 Hz, in accordance with any one of claims 8 to 12.

Claim 14 in the present disclosure describes that a tensile strength of the aluminum base material used in the electrode is 30 to 450 MPa, in accordance with any one of claims 8 to 13.

Claim 15 in the present disclosure describes that the aluminum base material is held at 0 to 300° C. until performing the work plasticity of the aluminum base material subjected to the alternating current electrolytic treatment, in accordance with any one of claims 8 to 14.

Claim 16 in the present disclosure describes a bonded body of the surface-treated aluminum material and a member to be bonded, the bonded body including: the surface-treated aluminum material according to any one of claims 1 to 7; and the member to be bonded, closer to an alkali alternating current electrolytic oxide coating film of the surface-treated aluminum material.

Claim 17 in the present disclosure describes that the member to be bonded is resin, in accordance with claim 16.

Claim 18 in the present disclosure describes a method of producing a bonded body of a surface-treated aluminum material and a member to be bonded, the method being a method of producing the bonded body according to claim 17, wherein resin as the member to be bonded is heated to allow the resin to be in a flow state, the resin is brought into contact with a porous aluminum oxide coating film layer, the resin is allowed to permeate the porous aluminum oxide coating film layer, thereby allowing the resin in the flow state to flow into pores and working grooves, and the resin in the flow state is cooled and solidified, or cured.

Advantageous Effects of Invention

In accordance with the present disclosure, there are provided: a surface-treated aluminum material on which an alkali alternating current electrolytic oxide coating film with intimate contact durability and working followability with a member to be bonded, such as resin, is formed; and a production method in which the alkali alternating current electrolytic oxide coating film can be formed in a short time, and in a simple step. In accordance with the present disclosure, there are further obtained: a bonded body of the surface-treated aluminum material and the member to be bonded, including the surface-treated aluminum material and the member to be bonded, such as resin, and having excellent intimate contact durability and working followability; and a method of producing the bonded body.

DESCRIPTION OF EMBODIMENTS

The details of the present disclosure will be described in turn.

A. Aluminum Base Material

Pure aluminum or an aluminum alloy is used as an aluminum base material used in a surface-treated aluminum material according to the present disclosure. The components of the aluminum alloy are not particularly limited, and various alloys including alloys defined in JIS can be used. The shape thereof is not particularly limited, and a shape such as a flat-plate shape, an optional cross-sectional bar shape, or a cylindrical shape can be used. A flat-plate shape is preferably used because an alkali alternating current electrolytic oxide coating film can be stably formed.

When the aluminum base material has a flat-plate shape, an alkali alternating current electrolytic oxide coating film may be formed on any one surface of the flat plate, or alkali alternating current electrolytic oxide coating films may be formed on both surfaces thereof. When the aluminum base material has an optional cross-sectional bar shape, an alkali alternating current electrolytic oxide coating film may be formed on an entire surface, or on a part of the surface. When the aluminum base material has a cylindrical shape, an alkali alternating current electrolytic oxide coating film may be formed on the entire surface of at least one of the outer and inner surfaced of a cylinder, or on a part of the surface.

B. Alkali Alternating Current Electrolytic Oxide Coating Film

Figure 1A:
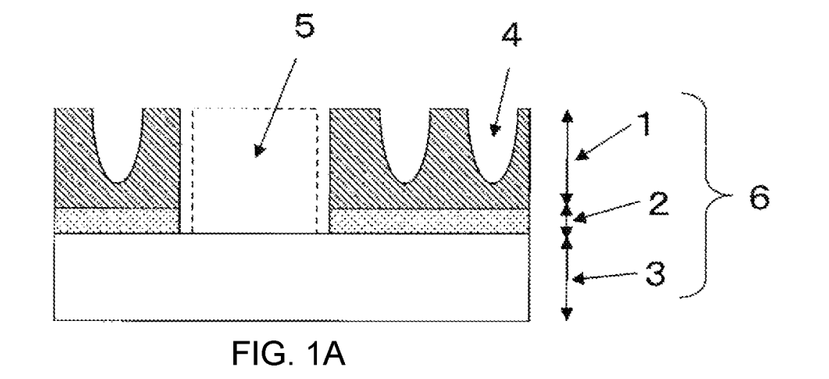
FIG. 1 is a schematic view of a surface-treated aluminum material according to the present disclosure.

As illustrated in FIG. 1A, an alkali alternating current electrolytic oxide coating film is formed on at least a part of a surface of an aluminum base material 3 in a surface-treated aluminum material 6 according to the present disclosure. In the example of FIG. 1A, the alkali alternating current electrolytic oxide coating film is formed on the one surface of the aluminum base material 3. The alkali alternating current electrolytic oxide coating film includes a porous-type aluminum oxide coating film layer 1 formed on a surface side and a barrier-type aluminum oxide coating film layer 2 formed on a base material side which is the aluminum base material, and includes a working groove 5 perpendicular to the direction of plastic working of the material. Reference numeral 4 in the figure denotes pores formed on the porous-type aluminum oxide coating film layer 1.

The thickness of the alkali alternating current electrolytic oxide coating film can be in a range of 23 to 1030 nm which is the sum of the thicknesses of the porous-type aluminum oxide coating film layer and barrier-type aluminum oxide coating film layer described later, and is preferably 30 to 1000 nm, and more preferably 50 to 500 nm. When the thickness is less than 23 nm, the intimate contact durability of the alkali alternating current electrolytic oxide coating film may be deteriorated. When the thickness is more than 1030 nm, a surface layer portion of the porous-type aluminum oxide coating film layer may be partly dissolved, thereby also deteriorating the intimate contact durability of the alkali alternating current electrolytic oxide coating film.

The surface-treated aluminum material 6 of FIG. 1A is in a state in which the aluminum base material 3 is subjected to alkali alternating current electrolytic treatment, an alkali alternating current electrolytic oxide coating film is formed on a surface thereof, and the material is then subjected to plastic working, thereby forming the working groove 5. The alkali alternating current electrolytic oxide coating film is formed on at least a part of the surface of the aluminum base material 3, that is, on the entire surface or a part of the surface by the alkali alternating current electrolytic treatment.

Figure 1B:
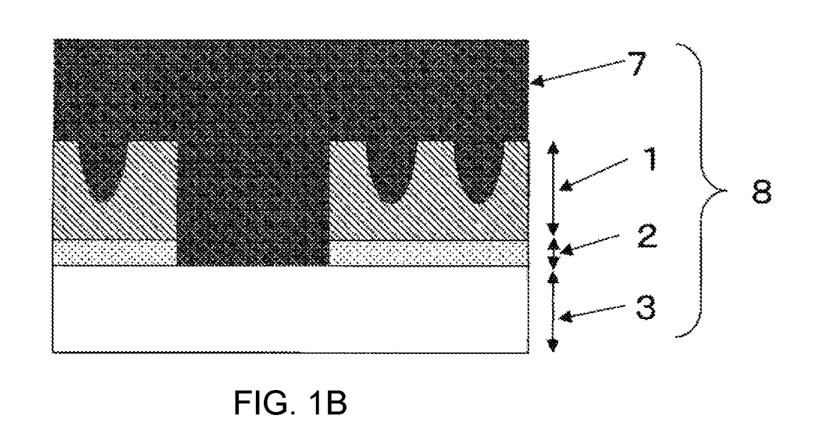

Then, FIG. 1B illustrates a bonded body 8 of the surface-treated aluminum material and a member to be bonded, in which the member to be bonded 7, such as resin, is bonded to an alkali alternating current electrolytic oxide coating film side of the surface-treated aluminum material 6 in the state of FIG. 1A, that is, the bonded body 8 of the surface-treated aluminum material and the member to be bonded, including the surface-treated aluminum material 6 and the member to be bonded 7, such as resin, on the alkali alternating current electrolytic oxide coating film side of the surface-treated aluminum material 6. Because the member to be bonded 7 flows into both the pores 4 and the working groove 5 and is bonded to the pores 4 and the working groove 5, the firmer bonded body 8 of the aluminum base material 3 and the member to be bonded 7 via the alkali alternating current electrolytic oxide coating film is obtained.

B-I. Working Groove

In the present disclosure, plural working grooves perpendicular to the direction of plastic working of a material are formed in order to improve bondability to resin or the like as a body to be bonded, in an alkali alternating current electrolytic oxide coating film. Such working grooves are generated along the direction perpendicular to the direction of the plastic working so as to pass through and link pores on a wall surface. When a material working direction in the plastic working is one direction like tensile molding, rolling molding, extrusion molding, and the like, the plural working grooves which are approximately perpendicular to the working direction and are approximately linear are formed. In contrast, when material working directions are plurality directions like press molding, stretch molding, and the like, the working grooves which are not linear but are approximately perpendicular to the working directions are formed.

As illustrated in FIG. 1B, the member to be bonded 7, such as resin, flows into such working grooves 5, whereby the flowing member to be bonded 7 is not only bonded to the alkali alternating current electrolytic oxide coating film to exhibit an anchor effect but also bonded to the working grooves of the aluminum base material 3 to exhibit an anchor effect, and therefore, the alkali alternating current electrolytic oxide coating film (1+2) can be suppressed from peeling from the base material of the aluminum base material 3.

Such a working groove is a groove extending in a longitudinal direction perpendicular to the direction of plastic working, and a length orthogonal to the longitudinal direction is regarded as the width of the working groove. The width of the working groove is preferably 5 to 5000 nm, and more preferably 10 to 2000 nm. When the widths of such working grooves are less than 5 nm, there may be working grooves into which the member to be bonded does not flow in the case of intimate contact of the member to be bonded, such as resin. A gap caused by such a working groove into which the member to be bonded does not flow results in a decrease in bond strength. In contrast, when the widths of such working grooves are more than 5000 nm, a portion occupied by pores in a bond portion may be reduced, and an anchor effect caused by the pores may be reduced, thereby decreasing bond strength.

A spacing between working grooves adjacent to each other is preferably 5 to 5000 nm, and more preferably 10 to 2000 nm. When the spacing between working grooves is less than 5 nm, the density of such working grooves is extremely increased. As a result, the amount of alkali alternating current electrolytic oxide coating film coming into contact with an aluminum base material in a bond portion may be decreased, whereby the aluminum base material may peel from the base material. In contrast, when the spacing between such working grooves is more than 5000 nm, a portion occupied by such working grooves is reduced in a bond portion, the anchor effect of the member to be bonded, existing in the working grooves, on the aluminum base material is reduced. As a result, it may be impossible to obtain desired bond strength between the member to be bonded such as resin and the aluminum base material.

B-2. Porous-Type Aluminum Oxide Coating Film Layer

As illustrated in FIGS. 1A and 1B, the pores 4 internally extending from the surface are formed on the porous-type aluminum oxide coating film layer 1. The rate of the total sum of the opening areas of all the present pores 4 with respect to the surface area (calculated in length×width), regardless of recesses and projections, of the surface of the porous-type aluminum oxide coating film layer 1 is regarded as the area occupancy rate of the pores, and the area occupancy rate of the pores is preferably set at 5 to 50%, and more preferably set at 10 to 45%. When the area occupancy rate of the pores is less than 5%, the anchor effect exhibited by the pore in the bonding of resin or the like as the member to be bonded is insufficient. As a result, the intimate contact durability of the alkali alternating current electrolytic oxide coating film may be deteriorated. In contrast, when the area occupancy rate is more than 50%, the large anchor effect is obtained in an early stage; however, since the area occupancy rate is too high, the anchor effect described above greatly decreases with time, and the intimate contact durability of the alkali alternating current electrolytic oxide coating film may be rather deteriorated.

The openings of the pores 4 on the surface of the porous-type aluminum oxide coating film layer 1 have various shapes such as circular, elliptical, rectangular, and polygonal shapes, when being observed from above. The maximum length of the diameters of such an opening is regarded as a maximum diameter. For example, when the shape of such an opening is a circular shape, the diameters of the opening are the same diameter, and the maximum diameter is defined as the diameter. In contrast, when the shape of such an opening is an elliptical shape, the diameters of the opening are changed from a minor diameter to a major diameter, and the maximum diameter is defined as the major diameter. In the case of a rectangular shape, a polygonal shape, or the like, the maximum of the diameters measured in such an opening is also similarly defined as the maximum diameter. The arithmetic average value of the respective maximum diameters of all the pores present on the surface of the porous-type aluminum oxide coating film layer 1 is defined as an average maximum diameter.

The average maximum diameter described above is preferably 5 to 120 nm, and more preferably 10 to 30 nm. When the average maximum diameter is less than 5 nm, an anchor effect in the bonding of resin or the like may be insufficient, and the intimate contact durability of the alkali alternating current electrolytic oxide coating film may be deteriorated, similarly in a case in which the area occupancy rate of the pores is insufficient. In contrast, when the average maximum diameter is more than 120 nm, an anchor effect in the bonding of resin or the like may be reduced with time, and the intimate contact durability of the alkali alternating current electrolytic oxide coating film may be deteriorated, similarly in a case in which the area occupancy rate of the pores is excessive. Further, a portion excluding the pores in the porous-type aluminum oxide coating film layer may be reduced, an anchor effect may be greatly decreased with time, and the intimate contact durability of the alkali alternating current electrolytic oxide coating film may be rather deteriorated, similarly in the case in which the area occupancy rate of the pores is excessive.

The thickness of the porous-type aluminum oxide coating film layer is preferably 20 to 1000 nm, and more preferably 30 to 500 nm. When the thickness of the porous-type aluminum oxide coating film layer is less than 20 nm, the thickness is insufficient, and therefore, the formation of a pore structure and the formation of working grooves are inhibited. As a result, an anchor effect caused by the pores in the bonding of resin or the like may be insufficient, a gap portion in which the resin is prevented from flowing into the working grooves may be further generated, and bond strength caused by the alkali alternating current electrolytic oxide coating film may be decreased. In contrast, when the thickness of the porous-type aluminum oxide coating film layer is more than 1000 nm, the cohesion failure of the porous-type aluminum oxide coating film layer in itself may be prone to occur, and the alkali alternating current electrolytic oxide coating film may fall off from the base material of the aluminum base material at the time of the formation of the working grooves.

B-3. Barrier-Type Aluminum Oxide Coating Film Layer

The thickness of the barrier-type aluminum oxide coating film layer between the porous-type aluminum oxide coating film layer and the base material of the aluminum base material is preferably 3 to 30 nm, and more preferably 5 to 25 nm. When the thickness of the barrier-type aluminum oxide coating film layer is less than 3 nm, the interposed barrier-type aluminum oxide coating film layer is thin, and therefore, bonding power for bonding the porous-type aluminum oxide coating film layer and the base material of the aluminum base material may be lowered, thereby damaging the porous-type aluminum oxide coating film layer at the time of the formation of the working grooves. In contrast, when the thickness of the barrier-type aluminum oxide coating film layer is more than 30 nm, the grooves formed at the formation of the working grooves may become nonuniform.

C. Method of Producing Surface-Treated Aluminum Material

A method of producing the surface-treated aluminum material according to the present disclosure will be described below.

C-1. Electrode

Examples of a method for producing a surface-treated aluminum material including a surface provided with an alkali alternating current electrolytic oxide coating film satisfying the conditions described above may include a method in which an alkali alternating current electrolytic oxide coating film is formed by performing alternating current electrolytic treatment under predetermined conditions using an aluminum base material to be surface-treated as one electrode and the other counter electrode.

In the present disclosure, the tensile strength of the electrode of the aluminum base material subjected to the alternating current electrolytic treatment is preferably 30 to 450 MPa, and more preferably 50 to 400 MPa. When the tensile strength is less than 30 MPa, the widths of working grooves may be low, and working grooves into which a member to be bonded does not flow may exist in the case of the intimate contact of the member to be bonded, such as resin. Gaps caused by such working grooves into which the member to be bonded does not flow may result in a decrease in bond strength. In contrast, when the tensile strength is more than 450 MPa, the introduction of working grooves may be inhibited, and the anchor effect of the working grooves on the aluminum base material may be reduced.

In the present disclosure, the shapes of the counter electrode and the aluminum base material subjected to the alternating current electrolytic treatment are not particularly limited, and the aluminum base material and the counter electrode having plate shapes are preferably used in order to equalize a distance between the aluminum base material and the counter electrode to stably form the alkali alternating current electrolytic oxide coating film subjected to the alternating current electrolytic treatment.

Figure 2:
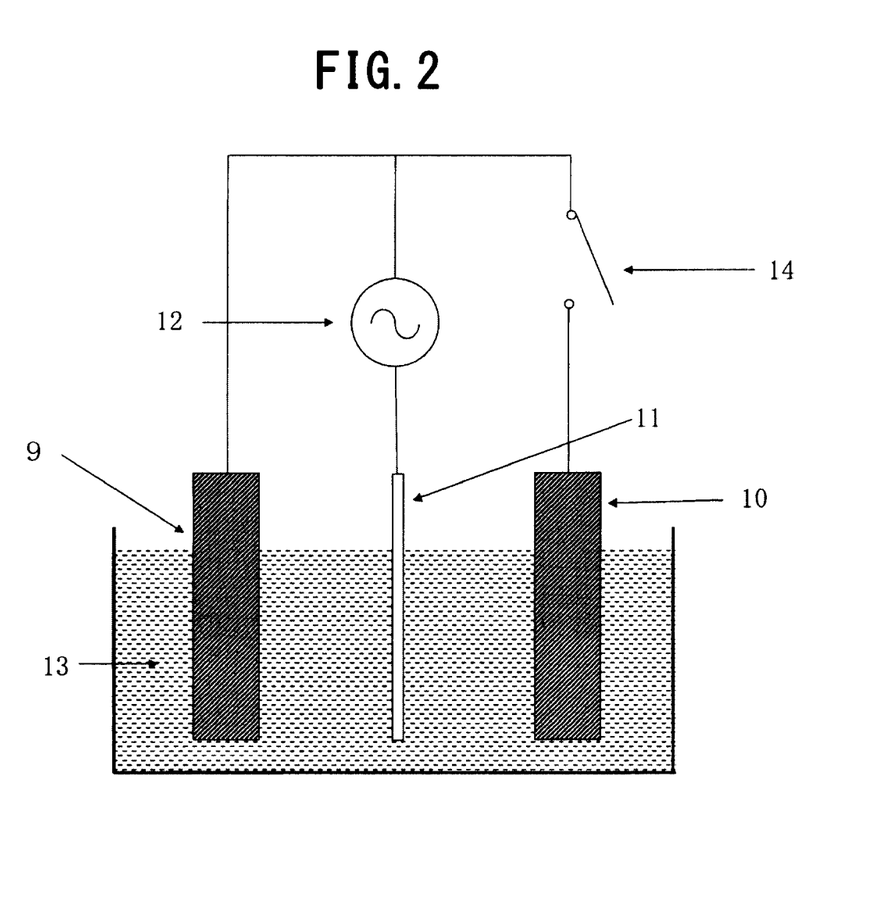
FIG. 2 is a front view illustrating an electrolytic apparatus used in a method of producing a surface-treated aluminum material according to the present disclosure.

As illustrated in FIG. 2, connected counter electrode plates 9 and 10 are prepared, and are preferably placed so that both surfaces of an aluminum substrate 11 to be surface-treated are parallel to surfaces of the counter electrode plates 9 and 10, respectively, between the two counter electrode plates. The aluminum substrate 11 is connected to the counter electrode plates 9 and 10 through an alternating current power source 12. The aluminum substrate 11 and the counter electrode plates 9 and 10 are placed in an electrolytic bath in which an electrolytic solution 13 as an aqueous alkaline solution is poured. The dimensions of the aluminum substrate 11 and counter electrode planes which face each other are allowed to be approximately equal to each other, and it is preferable to perform electrolysis operation with both the electrodes in a stationary state. In the case of treating only one surface of the aluminum substrate 11 to be surface-treated, only the one surface of the aluminum substrate 11 (the left surface of the aluminum base material electrode in the figure) can be treated by turning off a counter electrode plate connection switch 14.

One electrode of the electrodes in a pair, used in the alternating current electrolytic treatment, is an aluminum base material to be surface-treated by electrolytic treatment. As the other counter electrode, for example, a known electrode such as a graphite, aluminum, or titanium electrode can be used, and it is necessary to use an electrode with a material that is not deteriorated by an alkaline component in the electrolytic solution, and a temperature, has excellent conductivity, and is further prevented from per se causing electrochemical reaction. From such a viewpoint, a graphite electrode is preferably used as the counter electrode. This is because a graphite electrode is a chemically stable, inexpensively available, electric flux lines are appropriately diffused in an alternating current electrolysis step by the action of many pores present in a graphite electrode, and therefore, it is easy to allow both the porous-type aluminum oxide coating film layer and the barrier-type aluminum oxide coating film layer to be further uniform.

C-2. Alternating Current Electrolytic Treatment Conditions

The alternating current electrolytic treatment allows an aqueous alkaline solution to be an electrolytic solution using the electrode and counter electrode of the aluminum base material described above.

In the present disclosure, a phosphate such as sodium phosphate, sodium hydrogenphosphate, sodium pyrophosphate, potassium pyrophosphate, or sodium metaphosphate; an alkali metal hydroxide such as sodium hydroxide or potassium hydroxide; a carbonate such as sodium carbonate, sodium hydrogen carbonate, or potassium carbonate; ammonium hydroxide; or an aqueous solution containing a mixture thereof can be used as the alkali aqueous solution used as the electrolytic solution. Since it is necessary to keep the pH of the electrolytic solution in a certain range as described below, it is preferable to use an aqueous alkaline solution containing a phosphate-based substance which can be expected to have a buffer effect. The concentration of an alkaline component contained in such an aqueous alkaline solution is adjusted as appropriate so that the pH of the electrolytic solution has a desired value, and is commonly $1 \times 10^{-4}$ to 1 mol/liter, and preferably $1 \times 10^{-3}$ to 0.8 mol/liter. A surfactant, a chelating agent, and/or the like may be added to such aqueous alkaline solutions in order to enhance the cleanliness of a surface of the aluminum material.

The pH of the electrolytic solution used in the present disclosure is preferably 9 to 13, and more preferably 9.5 to 12.5. When the pH is less than 9, the alkali etching power of the electrolytic solution is insufficient, and therefore, the pores of the porous-type aluminum oxide coating film layer become small, whereby the intimate contact property of the alkali alternating current electrolytic oxide coating film may be deteriorated. In contrast, when the pH is more than 13, the alkali etching power becomes excessive, and therefore, the porous-type aluminum oxide coating film layer may be dissolved, whereby the intimate contact property of the alkali alternating current electrolytic oxide coating film may also be deteriorated.

The temperature of the electrolytic solution used in the present disclosure is preferably 30 to 90° C., and more preferably 35 to 85° C. When the temperature of the electrolytic solution is less than 30° C., the alkali etching power is insufficient, and therefore, the pores of the porous-type aluminum oxide coating film layer become small, whereby the intimate contact property of the alkali alternating current electrolytic oxide coating film may be deteriorated. In contrast, when the temperature is more than 90° C., the alkali etching power becomes excessive, and therefore, the porous-type aluminum oxide coating film layer may be dissolved, whereby the intimate contact property of the alkali alternating current electrolytic oxide coating film may also be deteriorated.

In the alternating current electrolytic treatment in the present disclosure, the current density is preferably 4 to 50 $A/dm^2$, and more preferably 5 to 40 $A/dm^2$. When the current density is less than 4 $A/dm^2$, only the barrier-type aluminum oxide coating film layer in the alkali alternating current electrolytic oxide coating film is preferentially formed, and therefore, the porous-type aluminum oxide coating film layer may be prevented from being obtained. In contrast, when the current density is more than 50 $A/dm^2$, a current becomes excessive, and therefore, it is difficult to control the thickness of the porous-type aluminum oxide coating film layer, whereby unevenness in treatment is prone to occur, and the porous-type aluminum oxide coating film layer may fall off from the aluminum base material in a portion in which the alkali alternating current electrolytic oxide coating film is extremely thick in the case of introducing working grooves.

As alternating current electrolytic treatment conditions in the present disclosure, an alternating current frequency and an electrolysis time period are preferably as follows.

The electrolysis time period is preferably 5 to 600 seconds, and more preferably 10 to 500 seconds. When the treatment time period is less than 5 seconds, the formation of the porous-type aluminum oxide coating film layer may be insufficient. As a result, the intimate contact property of the alkali alternating current electrolytic oxide coating film may become insufficient. In contrast, when the treatment time period is more than 600 seconds, the porous-type aluminum oxide coating film layer may excessively become thick, and the porous-type aluminum oxide coating film layer may be redissolved. In this case, the porous-type aluminum oxide coating film layer may fall off from the base material of the aluminum base material in a portion in which the alkali alternating current electrolytic oxide coating film is extremely thick at the time of introducing working grooves.

The alternating current frequency is preferably 10 to 100 Hz, and more preferably 20 to 80 Hz. When the alternating current frequency is less than 10 Hz, the formation of the porous-type aluminum oxide coating film layer is suppressed as a result of enhancing a galvanic element in the electrolysis. As a result, in the case of introducing working grooves, the widths of the grooves may become excessively low, and the member to be bonded, such as resin, may be prevented from flowing into the interiors of the working grooves. In contrast, when the alternating current frequency is more than 100 Hz, an anode and a cathode are too rapidly inverted, and therefore, the formation of the overall alkali alternating current electrolytic oxide coating film becomes extremely slow, whereby a very long time period is required for obtaining the predetermined thickness of the porous-type aluminum oxide coating film layer. The waveform of a sine wave, a square wave, a trapezoidal wave, a triangular wave, or the like can be used as an electrolysis waveform in the alternating current electrolytic treatment.

Surface observation with a field emission electron microscope (FE-SEM) is preferably used in measurement of the width and spacing of working grooves in the present disclosure. Specifically, the width of an observed optional working groove can be measured from secondary electron images obtained by photographing plural spots at an acceleration voltage of 2 kV and in an observation visual field of 10 μm×7 μm. A distance between optional two binary working grooves adjacent to each other can also be measured as a spacing between working grooves in a similar manner. The arithmetic average values of the measurement values of plural spots in one observation visual field are regarded as the width and spacing of the working grooves.

Surface observation with a field emission form electron microscope (FE-SEM) and particle analysis with image analysis software A-ZO-KUN (ver. 2.50, manufactured by Asahi Kasei Engineering Corporation) are preferably used in measurement of the average maximum diameter and area occupancy rate of the pores of the porous-type aluminum oxide coating film layer in the present disclosure. Specifically, secondary electron images obtained by photographing plural spots at an acceleration voltage of 2 kV and in an observation visual field of 1 μm×0.7 μm are captured into the image analysis software, and the particle analysis is performed at each spot in which pore portions observed on the surface of the porous-type aluminum oxide coating film layer are regarded as particles.

As a result, the maximum diameters and opening areas of all the pores on the surface of the porous-type aluminum oxide coating film layer can be measured in the spots. The average maximum diameter is determined based on the arithmetic average value of the maximum diameters of the pores in the plural spots, obtained in such a manner. In addition, the area occupancy rate of the pores in the spots is obtained based on the ratio of the total sum of the opening areas of all the pores to the total area regardless of recesses and projections in the spots, and the area occupancy rate of the pores is determined based on the arithmetic average value in the plural spots, obtained in such a manner. The maximum diameter, average maximum diameter, and area occupancy rate of the pores are as defined above.

Cross-section observation with a transmission electron microscope (TEM) is preferably used in measurement of the thicknesses of the porous-type aluminum oxide coating film layer and the barrier-type aluminum oxide coating film layer in the present disclosure. Specifically, the measurement is performed by working each oxide coating film layer portion into a thin piece with an ultramicrotome or the like, and observing the thin piece with the TEM. The arithmetic average value of measurement values at plural spots in one observation visual field is regarded as the thickness of each of these oxide coating films layers.

The working grooves in the present disclosure are formed by forming the alkali alternating current electrolytic oxide coating film by the alternating current electrolytic treatment, and then plastically deforming, at a predetermined strain rate, the aluminum base material on which the alkali alternating current electrolytic oxide coating film is formed.

Specifically, the working grooves are formed by plastically working, at a strain rate of $1.0 \times 10^{-3}$ to $1.0 \times 10^{3}$/s, preferably $5.0 \times 10^{-3}$ to $1.0 \times 10^{2}$/s, the aluminum base material on which the alkali alternating current electrolytic oxide coating film is formed. When the strain rate is less than $1.0 \times 10^{-3}$/s, cracks propagate on the entire surface from the porous-type aluminum oxide coating film layer regardless of a working direction, and the alkali alternating current electrolytic oxide coating film detaches from the base material of the aluminum base material. As a result, it is impossible to obtain a desired bond strength caused by the alkali alternating current electrolytic oxide coating film. In contrast, when the strain rate is more than $1.0 \times 10^{3}$/s, not only the desired working grooves but also surplus grooves parallel to the working direction are generated, thereby causing damage to the alkali alternating current electrolytic oxide coating film in itself.

It is not necessary that the strain rate is always constant. The strain rate during deformation may be in the range described above. The strain rate of a portion on which a working groove is formed can be measured using an extensometer. The strain rate in working can be easily measured with the extensometer placed on a portion to which the member to be bonded, such as resin, is bonded in the surface-treated aluminum material.

In the present disclosure, it is preferable to hold, preferably in a temperature range of 0 to 300° C., and more preferably 5 to 280° C., the aluminum base material on which the alkali alternating current electrolytic oxide coating film is formed, during a period between the subjection of the aluminum base material to alkali alternating current electrolytic treatment and the formation of the working grooves by the plastic working.

When this holding temperature is less than 0° C., the widths of the working grooves may become nonuniform, and the intimate contact property of the alkali alternating current electrolytic oxide coating film may be partly deteriorated. In addition, condensation may occur on the portions of the working grooves, thereby causing local corrosion. In contrast, when the holding temperature is more than 300° C., cracks may be generated by heating regardless of the direction of the plastic working. As a result, the alkali alternating current electrolytic oxide coating film may partly fall off from the base material of the aluminum base material when working grooves are molded in a state in which such cracks are generated.

It is not necessary that the holding temperature described above is a constant temperature during the holding. The holding temperature may vary within a range of 0 to 300° C.

D. Bonded Body of Surface-Treated Aluminum Material and Member to be Bonded

As illustrated in FIG. 1B, the member to be bonded, such as resin, is bonded to the surface-treated aluminum material according to the present disclosure, to obtain the bonded body 8 of the surface-treated aluminum material and the member to be bonded. As described above, in such a bonded body, the member to be bonded 7, such as resin, is bonded to both of the alkali alternating current electrolytic oxide coating film (1+2) and the base material of the aluminum base material 3, the member to be bonded 7 flows into both of the pores 4 and the working groove 5 to exhibit an anchor effect, and therefore, the bonding of the aluminum base material 3 and the member to be bonded 7 via the alkali alternating current electrolytic oxide coating film (1+2) can be allowed to be firmer.

Such a bonded body 8 of the surface-treated aluminum material and the member to be bonded can be used depending on various applications. As the member to be bonded, a resin, a metal, a ceramic, or the like is used, and a resin is preferably used in view of the easiness of the bonding and the possibility of expansion of various applications. Each of a thermosetting resin and a thermoplastic resin can be used as the resin, which allows various effects to be imparted in combination with the characteristics of the specific alkali alternating current electrolytic oxide coating film formed on the treated surface of the surface-treated aluminum material according to the present disclosure.

For example, since such a bonded body commonly has the high thermal expansion coefficient of the resin in comparison with an aluminum base material, peeling and cracking are prone to occur on a bonded interface. However, in the bonded body of the surface-treated aluminum material according to the present disclosure and the resin, the alkali alternating current electrolytic oxide coating film in the present disclosure is very thin and has a specific shape and structure as described above, and therefore, the alkali alternating current electrolytic oxide coating film has high bond strength and excellent flexibility, easily follows the expansion of the resin, and is resistant to peeling and cracking. A bonded body of the surface-treated aluminum material according to the present disclosure and a thermoplastic resin can be preferably used as a light-weight and high-rigidity composite material. A bonded body of the surface-treated aluminum material according to the present disclosure and a thermosetting resin can be preferably used in applications as printed wiring boards.

Various thermoplastic resins and thermosetting resins can be used as the resin described above. Specifically, with regard to such a thermoplastic resin, the resin made in a flow state by applying heat to the resin is brought into contact with a porous aluminum oxide coating film layer, and allowed to permeate the porous aluminum oxide coating film layer, and the resultant is cooled and solidified to thereby form a resin layer. For example, polyolefins (polyethylene, polypropylene, and the like), polyvinyl chloride, polyesters (polyethylene terephthalate, polybutylene terephthalate, and the like), polyamides, polyphenylene sulfides, aromatic polyether ketones (polyether ether ketone, polyether ketone, and the like), polystyrene, various fluorine resins (polytetrafluoroethylene, polychlorotrifluoroethylene, and the like), acrylic resins (polymethyl methacrylate and the like), ABS resins, polycarbonates, thermoplastic polyimides, and the like can be used as the thermoplastic resin.

The thermosetting resin in the state of having flowability prior to being cured may be brought into contact with a porous aluminum oxide coating film layer, and may be allowed to permeate the porous aluminum oxide coating film layer, and the resultant may be then cured. For example, phenol resins, epoxy resins, melamine resins, urea resins, unsaturated polyester resins, alkyd resins, polyurethane, thermosetting polyimides, and the like can be used as the thermosetting resin.

With regard to the thermoplastic resin and thermosetting resin described above, each thereof may be used singly, or a polymer alloy in which plural kinds of thermoplastic resins or plural kinds of thermosetting resins are mixed may be used. Physical properties such as the strengths and thermal expansion coefficients of the resins may also be improved by addition of various fillers. Specifically, various fibers such as glass fibers, carbon fibers, and aramid fibers, as well as fillers with known substances such as calcium carbonate, magnesium carbonate, silica, talc, glass, and clay can be used.

EXAMPLES

Preferred embodiments of the present disclosure will be described in detail below with reference to Examples and Comparative Examples.

Examples 1 to 2, and Comparative Examples 1 to 3

A flat plate with an aluminum alloy according to RS 5052-0 having a length of 600 mm, a width of 800 mm, and a thickness of 2.0 mm was used as an aluminum base material to be subjected to electrolytic treatment. The aluminum alloy plate has a tensile strength of 195 MPa at 25° C.

The aluminum alloy plate was used as one electrode, and graphite electrodes as a pair of flat plates having a length of 500 mm, a width of 550 mm, and a thickness of 2.0 mm were used as counter electrodes. As illustrated in FIG. 2, connected graphite counter electrode plates 9 and 10 were prepared, and placed so that both surfaces of an aluminum substrate 11 to be surface-treated were parallel to surfaces of the counter electrode plates 9 and 10, respectively, between the two counter electrode plates. The aluminum substrate 11 is connected to the counter electrode plates 9 and 10 through an alternating current power source 12, and the aluminum substrate 11 and the counter electrode plates 9 and 10 are placed in an electrolytic bath in which an electrolytic solution 13 as an aqueous alkaline solution is poured. Alkali alternating current electrolytic treatment was performed using such an electrolytic apparatus in a state in which a counter electrode plate connection switch 14 was turned on. Alkali alternating current electrolytic oxide coating films including a porous-type aluminum oxide coating film layer in a surface side and a barrier-type aluminum oxide coating film layer in a base material side were formed on both the surfaces of the aluminum substrate 11, facing the two graphite counter electrode plates 9 and 10, respectively, by the alkali alternating current electrolytic treatment. Each of the three identical aluminum base materials was subjected to the electrolytic treatment, and the arithmetic average values of the three materials were set at the numerical value results set forth in the table.

An aqueous alkaline solution having a pH and temperature set forth in Table 1 and containing sodium pyrophosphate as a main component was used as the electrolytic solution used in the electrolytic treatment. The pH was adjusted as appropriate with 0.1 mol/liter of a NaOH aqueous solution. The concentration of electrolyte in the aqueous alkaline solution was set at 0.1 mol/liter. As illustrated in FIG. 2, the electrode of the aluminum alloy plate and both the counter electrodes were arranged in the electrolytic bath accommodating the electrolytic solution, and alternating current electrolytic treatment was performed under the electrolytic treatment conditions set forth in Table 1. The lengthwise directions of the electrode of the aluminum alloy plate and the graphite counter electrodes were allowed to be the same as the depth direction of the electrolytic bath.

TABLE 1

| | Aluminum Base Material | | | Electrolytic Treatment Conditions | | | | Porous-Type Aluminum Oxide Coating Film Layer | |
|---|---|---|---|---|---|---|---|---|---|
| | | | Electrolytic Solution | | | | | Average | Maximum |
| | Alloy | Tensile Strength [MPa] | pH | Temperature [° C.] | Frequency [Hz] | Current Density [A/dm²] | Electrolysis Time Period [s] | Thickness [nm] | Diameter of Pores [nm] |
| Example 1 | A5052 | 195 | 11.0 | 60 | 50 | 10 | 30 | 250 | 15 |
| Example 2 | A5052 | 195 | 11.0 | 60 | 50 | 10 | 30 | 250 | 20 |
| Comparative Example 1 | A5052 | 195 | 11.0 | 60 | 50 | 10 | 30 | 208 | 15 |
| Comparative Example 2 | A5052 | 195 | 11.0 | 60 | 50 | 10 | 30 | 186 | 20 |
| Comparative Example 3 | A5052 | 195 | 11.0 | 60 | DC | 10 | 30 | None | |

| | Plastic Working Conditions | | | | | |
|---|---|---|---|---|---|---|
| | Strain Rate [/s] | Temperature of Aluminum Base Material Until Working Plastically [° C.] | Direction of Formation of Working Grooves | Width of Working Groove [nm] | Spacing between Working Grooves [nm] | Barrier-Type Aluminum Oxide Coating Film Layer Thickness [nm] |
| Example 1 | $1.0 \times 10^{-3}$ | 25 | Perpendicular to working direction | 30 | 100 | 15 |
| Example 2 | $1.0 \times 10^{3}$ | 25 | Perpendicular to working direction | 5000 | 2000 | 15 |
| Comparative Example 1 | $5.0 \times 10^{-3}$ | 25 | Regardless of working direction | 4 | 3 | 15 |
| Comparative Example 2 | $2.0 \times 10^{3}$ | 25 | Parallel to working direction | 5200 | 10 | 15 |
| Comparative Example 3 | $1.0 \times 10^{-3}$ | 25 | None | | | None |

The alkali alternating current electrolytic oxide coating films were formed on both the surfaces of the aluminum alloy plate electrode in such a manner as described above. The aluminum alloy plate electrode was taken out of the electrolytic bath immediately after the electrolytic treatment, washed with pure water at room temperature, dried in dry air at 80° C., and then held in atmosphere at room temperature (25° C.).

Then, working grooves were formed on each alkali alternating current electrolytic oxide coating film, prepared as described above, of the aluminum alloy plate electrode having the surfaces on which the alkali alternating current electrolytic oxide coating films were disposed. Specifically, a surface-treated aluminum material sample was produced by cutting 30 samples to have the shape of a No. 1 A specimen described in JIS Z2241 from each aluminum alloy plate electrode having the surfaces on which the alkali alternating current electrolytic oxide coating films were disposed, 10% tensile-deforming each sample using a tensile testing machine manufactured by Instron at the strain rate set forth in Table 1, and then unloading the sample. The produced samples were used in a test for evaluating intimate contact durability and a test for evaluating the bondability of a thermoplastic resin, described later.

The surface-treated aluminum material sample produced as described above was subjected to the following measurement and estimation.

[Measurement of Average Maximum Diameter of Pores of Porous-Type Aluminum Oxide Coating Film Layer]

The average maximum diameter of the pores of the porous-type aluminum oxide coating film layer was measured by subjecting the surface-treated aluminum material sample produced as described above to surface observation (observation visual field: 0.7 µm×1 µm) with an FE-SEM. The results are set forth in Table 1. The arithmetic average value of the measurement results of pores at 100 spots was regarded as the average maximum diameter of pores set forth in Table I.

[Measurement of Width of Working Groove, And Spacing Between Working Grooves]

The width of a working groove, and the spacing between working grooves on the alkali alternating current electrolytic oxide coating film were measured by subjecting the surface-treated aluminum material sample produced as described above to surface observation (observation visual field: 10 µm×7 µm) with an FE-SEM. The results are set forth in Table 1. The arithmetic average values of the measurement results at 100 spots were regarded as the width of a working groove, and the spacing between working grooves, set forth in the table.

[Thickness of Porous-Type Aluminum Oxide Coating Film Layer and Barrier-Type Aluminum Oxide Coating Film Layer]

A cross section of the surface-treated aluminum material sample produced as described above was observed along in the lengthwise direction of the alkali alternating current electrolytic oxide coating film with a TEM. Specifically, the thickness of each of the porous-type aluminum oxide coating film layer and the barrier-type aluminum oxide coating film layer was measured. A thin-piece sample for cross-section observation was produced from a sample material using an ultramicrotome in order to measure the thickness of each of the oxide coating film layers. Then, 100 optional spots in the observation visual field (1 µm×1 µm) in the thin-piece sample were selected, and the thickness of each oxide coating film layer was measured by cross-section observation with a TEM. The results are set forth in Table 1. The arithmetic average value of the measurement results at the 100 spots was regarded as the thickness of each of the oxide coating film layers.

[Evaluation of Intimate Contact Durability of Alkali Alternating Current Electrolytic Oxide Coating Film]

Figure 3:
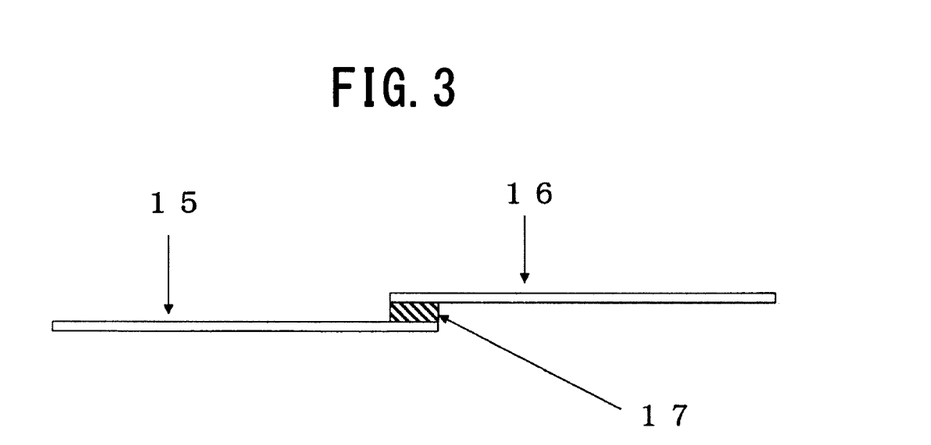
FIG. 3 is a front view of a sample for an intimate contact durability test on a surface-treated aluminum material according to the present disclosure.

Twenty sample materials having a length of 50 mm and a width of 25 mm, cut in parallel to each other, were prepared from the surface-treated aluminum material sample (JIS No. 1A specimen) produced as described above. The length and width of each sample are equal to those of each sample material. In an intimate contact durability test, first, two sample materials 15 and 16 were allowed to overlap each other so that a lengthwise overlap length was 10 mm (adhesive area: 10 mm×25 mm=250 mm$^2$), as illustrated in FIG. 3. The sample materials were adhesively bonded to each other using a one-component epoxy resin adhesive 17 to which glass beads having a diameter of 200 µm were added. Ten sets of such bonded bodies were produced. Then, the bonded body that had been adhesively bonded was heat-treated in a heating furnace at 170° C. for 20 minutes to cure the adhesive, thereby making a specimen for an intimate contact durability test.

The specimen produced as described above was subjected to a neutral salt spray test described in a salt spray test method (JIS Z 2371), taken out 1000 hours later, and stretched in a lengthwise direction at a rate of 5 mm/min by a tensile testing machine. The cohesion failure rate of the adhesive in an adhesion portion was measured, and evaluated based on the following criteria.

Excellent: cohesion failure rate of 95% or more
Good: cohesion failure rate of 85% or more and less than 95%
Fair: cohesion failure rate of 75% or more and less than 85%
Poor: cohesion failure rate of less than 75%

The results are set forth in Table 2. The number of sets evaluated as each of Excellent, Good, Fair, and Poor in the ten sets of the sample materials is set forth in the table. A case in which all the sets were evaluated as Excellent or Good was determined as acceptable, while the other cases were determined as unacceptable.

TABLE 2

|  | Evaluation of Intimate Contact Durability | | | | | Evaluation of Bondability of Thermoplastic Resin | | | | | Overall |
| --- | --- | --- | --- | --- | --- | --- | --- | --- | --- | --- | --- |
|  | Excellent | Good | Fair | Poor | Determination | Excellent | Good | Fair | Poor | Determination | Determination |
| Example 1 | 10 | 0 | 0 | 0 | Acceptable | 10 | 0 | 0 | 0 | Acceptable | Acceptable |
| Example 2 | 2 | 8 | 0 | 0 | Acceptable | 1 | 9 | 0 | 0 | Acceptable | Acceptable |
| Comparative Example 1 | 0 | 3 | 5 | 2 | Unacceptable | 1 | 9 | 0 | 0 | Acceptable | Unacceptable |
| Comparative Example 2 | 0 | 0 | 3 | 7 | Unacceptable | 0 | 0 | 1 | 9 | Unacceptable | Unacceptable |
| Comparative Example 3 | 0 | 0 | 1 | 9 | Unacceptable | 0 | 0 | 0 | 10 | Unacceptable | Unacceptable |

[Evaluation of Bondability of Thermoplastic Resin]

Ten sample materials having a length of 50 mm and a width of 10 mm cut from the surface-treated aluminum material sample produced as described above were prepared, and a bonded specimen was produced using a glass fiber-containing PPS resin (manufactured by DIC Corporation) by insert molding of the aluminum alloy plate. The surface-treated aluminum material sample was inserted into an injection mold, and the mold was closed and heated, thereby heating the bonded specimen to 150° C., followed by injecting the PPS resin at an injection temperature of 320° C., to obtain a bonded body having a shear specimen shape, illustrated in FIG. 4. A bond portion was allowed to be a portion having a length of 5 mm and width of 10 mm in an end of the surface-treated aluminum material sample.

Figure 4:
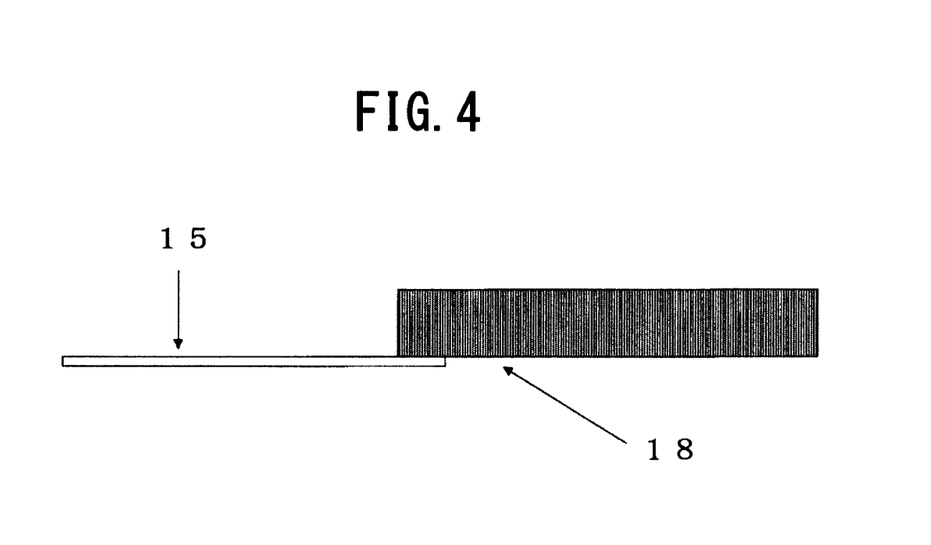
FIG. 4 is a front view of a bonded body in a shear specimen form using a surface-treated aluminum material according to the present disclosure.

The ten bonded bodies having a shear specimen, produced as described above, were stretched at a rate of 5 mm/min by a tensile testing machine. The cohesion failure rate of a PPS resin 18 as an adhesive in an adhesion portion was measured, and evaluated based on the following criteria. In FIG. 4, reference numeral 15 denotes the surface-treated aluminum material sample.

Excellent: cohesion failure rate of 95% or more
Good: cohesion failure rate of 85% or more and less than 95%
Fair: cohesion failure rate of 75% or more and less than 85%
Poor: cohesion failure rate of less than 75%

The results are set forth in Table 2. The number of bonded bodies having a shear specimen, evaluated as each of Excellent, Good, Fair, and Poor, in the ten bonded bodies having a shear specimen is set forth in the table. A case in which all the bonded bodies having a shear specimen were evaluated as Excellent or Good was determined as acceptable, while the other cases were determined as unacceptable.

[Overall Evaluation]

A case in which both of the evaluation of the intimate contact durability of the alkali alternating current electrolytic oxide coating film and the evaluation of the bondability of the thermoplastic resin were acceptable was evaluated as acceptable overall evaluation, while a case in which at least any one of the evaluations was unacceptable was evaluated as unacceptable overall evaluation.

As set forth in Table 2, Examples 1 to 2 satisfied the requirements of the present disclosure. Therefore, in Examples 1 to 2, the evaluation of the intimate contact durability of the alkali alternating current electrolytic oxide coating film and the evaluation of the bondability of the thermoplastic resin were acceptable, and the overall evaluation was also acceptable.

In contrast, Comparative Examples 1 to 3 did not satisfy the requirements of the present disclosure. Therefore, in Comparative Examples 1 to 3, any of the evaluation of the intimate contact durability of the alkali alternating current electrolytic oxide coating film and the evaluation of the bondability of the thermoplastic resin was unacceptable, and the overall evaluation was unacceptable.

Specifically, in Comparative Example 1, a strain rate in the formation of working grooves was insufficient, and cracks were generated regardless of a working direction. As a result, the evaluation of the durability of intimate contact was unacceptable, and the overall evaluation was unacceptable.

In Comparative Example 2, a strain rate in the formation of working grooves was excessive, and the grooves parallel to a working direction were generated. As a result, the evaluation of intimate contact durability and the evaluation of the bondability of a thermoplastic resin were unacceptable, and the overall evaluation was unacceptable.

In Comparative Example 3, direct current electrolytic treatment was performed instead of alternating current electrolytic treatment. As a result, an alkali alternating current electrolytic oxide coating film was not formed, the evaluation of intimate contact durability and the evaluation of the bondability of a thermoplastic resin were unacceptable, and the overall evaluation was unacceptable.

INDUSTRIAL APPLICABILITY

In accordance with the present disclosure, there can be obtained a surface-treated aluminum material having excellent intimate contact durability with a member to be bonded, such as resin, and having excellent working followability. As a result, the surface-treated aluminum material according to the present disclosure is also preferably used in a strongly worked aluminum/resin bonded member according to the present disclosure, and a resin coating aluminum material, requiring the intimate contact properties and working followability of an aluminum base material and the member to be bonded.

REFERENCE SIGNS LIST

1 Porous-type aluminum oxide coating film layer
2 Barrier-type aluminum oxide coating film layer
3 (Base material of) Aluminum base material
4 Pore
5 Working groove
6 Surface-treated aluminum material
7 Member to be bonded, such as resin
8 Bonded body of surface-treated aluminum material and member to be bonded
9 Counter electrode plate
10 Counter electrode plate
11 Aluminum substrate
12 Alternating current power source
13 Electrolytic solution
14 Counter electrode plate connection switch
15 Intimate contact durability test sample material
16 Intimate contact durability test sample material
17 One-component epoxy resin adhesive
18 PPS resin

The invention claimed is:

1. A method of producing a surface-treated aluminum material, the method comprising:
   subjecting an aluminum base material connected as a working electrode to an alternating current electrolytic treatment while using an aqueous alkaline solution as an electrolytic solution and a counter electrode to form an oxide coating on at least a part of a surface of the aluminum base material; and
   performing plastic working at a strain rate of $1.0 \times 10^{-3}$ to $1.0 \times 10^{3}$/s to form a plurality of working grooves perpendicular to a direction of plastic working on the oxide coating.

2. The method of producing the surface-treated aluminum material according to claim 1, wherein a temperature of the electrolytic solution as the aqueous alkaline solution is 30 to 90° C.

3. The method of producing the surface-treated aluminum material according to claim 1, wherein a pH of the electrolytic solution as the aqueous alkaline solution is 9 to 13.

4. The method of producing the surface-treated aluminum material according to claim 1, wherein an electrolytic treatment time period of the alternating current electrolytic treatment is 5 to 600 seconds.

5. The method of producing the surface-treated aluminum material according to claim 1, wherein a current density of the alternating current electrolytic treatment is 4 to 50 A/dm$^2$.

6. The method of producing the surface-treated aluminum material according to claim 1, wherein a frequency of the alternating current electrolytic treatment is 10 to 100 Hz.

7. The method of producing the surface-treated aluminum material according to claim 1, wherein a tensile strength of the aluminum base material used in the electrode is 30 to 450 MPa.

8. The method of producing the surface-treated aluminum material according to claim 1, wherein the aluminum base material is held at 0 to 300° C. until the performing plastic working.

* * * * *